US008196045B2

(12) United States Patent
Chandratillake et al.

(10) Patent No.: US 8,196,045 B2
(45) Date of Patent: Jun. 5, 2012

(54) VARIOUS METHODS AND APPARATUS FOR MOVING THUMBNAILS WITH METADATA

(75) Inventors: Suranga Chandratillake, San Francisco, CA (US); Matthew Scheybeler, Cambridge (GB); Adam Wilmer, Birmingham (GB)

(73) Assignee: Blinkx UK Limited, Cambridge, England (GB)

( * ) Notice: Subject to any disclaimer, the term of this patent is extended or adjusted under 35 U.S.C. 154(b) by 1180 days.

(21) Appl. No.: 11/657,227

(22) Filed: Jan. 23, 2007

(65) Prior Publication Data
US 2008/0086688 A1 Apr. 10, 2008

Related U.S. Application Data

(60) Provisional application No. 60/850,115, filed on Oct. 5, 2006.

(51) Int. Cl.
G06F 3/00 (2006.01)
(52) U.S. Cl. .................. 715/719; 715/721; 715/730
(58) Field of Classification Search .................. 715/719, 715/838, 764, 862
See application file for complete search history.

(56) References Cited

U.S. PATENT DOCUMENTS

| | | | |
|---|---|---|---|
| 5,485,611 A * | 1/1996 | Astle .................................. 707/1 |
| 5,565,888 A * | 10/1996 | Selker ............................ 715/823 |
| 5,969,755 A | 10/1999 | Courtney |
| 5,996,006 A | 11/1999 | Speicher |
| 6,182,069 B1 | 1/2001 | Niblack et al. |
| 6,339,438 B1 | 1/2002 | Bates et al. |
| 6,621,509 B1 | 9/2003 | Eiref et al. |
| 6,654,019 B2 | 11/2003 | Gilbert et al. |
| 6,961,954 B1 | 11/2005 | Maybury et al. |
| 6,973,257 B1 * | 12/2005 | Park et al. ........................ 386/69 |
| 7,027,513 B2 * | 4/2006 | Zhang et al. ............. 375/240.16 |
| 7,069,254 B2 * | 6/2006 | Foulger et al. .................. 706/14 |
| 7,117,453 B2 | 10/2006 | Drucker et al. |

(Continued)

FOREIGN PATENT DOCUMENTS
EP 0907147 A 4/1999
(Continued)

OTHER PUBLICATIONS

Christensen, Bill, Blinkx.tv and Heinlein's Newsbox, Science Fiction in the News, http://www.technovelgy.com, Oct. 3, 2005, 2 pages.

(Continued)

Primary Examiner — Omar Abdul-Ali
(74) Attorney, Agent, or Firm — Rutan and Tucker, LLP

(57) ABSTRACT

Various methods, apparatuses, and systems are described for a moving thumbnail generator. The moving thumbnail generator generates one or more moving thumbnails that are tagged and time-stamped to arbitrary video trigger events that take place in an associated original video file. Each of the moving thumbnails has two or more moving frames derived from its associated original video file at a portion in the original video file that is tagged and time-stamped to one or more relevant video trigger events in order for the generated moving thumbnail to summarize a visual content of the associated original piece of video file to a user. The tag carries information about content that takes place in the original video file and metadata about that content including a time reference to frames that are contextually relevant to the reason why a viewer of the thumbnail might be interested in viewing that thumbnail.

22 Claims, 8 Drawing Sheets

U.S. PATENT DOCUMENTS

| | | | | |
|---|---|---|---|---|
| 7,206,303 | B2* | 4/2007 | Karas et al. | 370/350 |
| 7,257,832 | B2 | 8/2007 | Beane et al. | |
| 7,272,594 | B1 | 9/2007 | Lynch et al. | |
| 7,370,381 | B2 | 5/2008 | Tuttle et al. | |
| 7,421,455 | B2 | 9/2008 | Hua et al. | |
| 2002/0171690 | A1 | 11/2002 | Fox et al. | |
| 2003/0026594 | A1* | 2/2003 | Shiiyama | 386/69 |
| 2003/0093409 | A1* | 5/2003 | Weil et al. | 707/3 |
| 2004/0125124 | A1* | 7/2004 | Kim et al. | 345/716 |
| 2005/0177805 | A1 | 8/2005 | Lynch et al. | |
| 2006/0031216 | A1 | 2/2006 | Semple et al. | |
| 2006/0110128 | A1 | 5/2006 | Dunton et al. | |
| 2006/0129533 | A1* | 6/2006 | Purvis | 707/3 |
| 2006/0242584 | A1* | 10/2006 | Johanson et al. | 715/738 |
| 2006/0288001 | A1* | 12/2006 | Costa et al. | 707/5 |
| 2007/0005569 | A1* | 1/2007 | Hurst-Hiller et al. | 707/3 |
| 2007/0237225 | A1* | 10/2007 | Luo et al. | 375/240.12 |
| 2008/0034306 | A1* | 2/2008 | Ording | 715/764 |
| 2008/0046406 | A1* | 2/2008 | Seide et al. | 707/3 |

FOREIGN PATENT DOCUMENTS

| | | | |
|---|---|---|---|
| EP | 1148722 | A1 | 10/2001 |
| EP | 1477933 | A | 11/2004 |
| EP | 1909195 | A1 | 4/2008 |
| WO | WO 01/42880 | A | 6/2001 |
| WO | WO 02/19720 | A | 3/2002 |

OTHER PUBLICATIONS

Gordon, Julie, "Technology: YouTube: Entertainment for Everyone", BusinessWeek On-Line, Aug. 3, 2006, 3 pages.

Holahan, Catherine, "Five for the Money: Online Video: Tasty Takeover Targets?", BusinessWeek On-Line, Aug. 24, 2006, 4 pages.

Holahan, Catherine, "Tech Review: AOL Video: Close But No TiVo", BusinessWeek On-Line, Aug. 7, 2006, 3 pages.

Holahan, Catherine, "Technology: Guba: The Good Stuff's Not Free", BusinessWeek On-Line, Aug. 24, 2006, 3 pages.

Holahan, Catherine, "Technology: Revver: A Video-Sharing Site on Pause", BusinessWeek On-Line, Aug. 11, 2006, 2 pages.

Sager, Ian, "Technology: Blinkx.tv: Quality Content, Unique Search", BusinessWeek On-Line, Aug. 22, 2006, 2 pages.

Sager, Ian, "Technology: Google Video: No Tube of Plenty", BusinessWeek On-Line, Aug. 18, 2006, 2 pages.

European Search Report and Opinion, European Patent Office, Application No. 07016004.9-1225, mail date Oct. 29, 2007, 11 pages.

Tonomura Y et al: "Content Oriented Visual Interface Using Video Icons for Visual Database Systems", Journal of Visual Languages and Computing, London, GB, vol. 1, Jan. 1990, p. 183-198, XP000195706.

Non-Final Office Action for U.S. Appl. No. 11/594,513 mailed Sep. 5, 2008, 15 pages.

Final Office Action for U.S. Appl. No. 11/594,513 mailed Mar. 18, 2009, 18 pages.

Michael Hickins: "Suranga Chandratillake, CTO, Blinkx" Internet Citation, [Online]Jan. 5, 2007, XP007906634 Retrieved from the Internet: URL:http://www.internetnews.com/xSP/print.php/3652231> [retrieved on Dec. 15, 2008].

Jason Pontin: "Millions of Videos, and Now a Way to Search Inside Them" The New York Times—NYTIMES.COM, [Online] Feb. 25, 2007, XP007906633 Retrieved from the Internet: URL: http://www.nytimes.com/2007/02/25/business/yourmoney/25slip.html> [retrieved on Dec. 16, 2008].

Blinkx: "About blinkx" Internet Citation—BLINKX.COM, [Online] May 22, 2007, XP007906637 Retrieved from the Internet: URL: http://us-store.blinkx.com/images/docs/ws_aboutblinkx.pdf> [retrieved on Dec. 15, 2008].

Keith Regan: "BlinkxTV Founder Suranga Chandratillake on the Future of Online Video Search" Internet Citation—ECOMMERCETIMES.COM, [Online] May 6, 2007, XP007906635 Retrieved from the Internet: URL: http://www.ecommercetimes.com/story/51530.html> [retrieved on Dec. 15, 2008].

Grant Crowell: "Blinkx Launches Contextual Online Video Search Ad Platform" Internet Citation—BLINKX.COM, [Online] Jun. 25, 2007, XP007906641 Retrieved from the Internet: URL: http://www.blinkx.com/article/blinkx-launches-contextual-online-video-search-ad-platform~417> [retrieved on Dec. 15, 2008].

Blinkx: "Blinkx Launches Adhoc, The First Contextual Online Video Advertising Platform" Internet Citation—BLINKX.COM, [Online] Jul. 25, 2007, XP007906638 Retrieved from the Internet: URL: http://www.blinkx.com/article/blinkx-launches-adhoc-first-contextual-online-video-advertising~409> [retrieved on Dec. 15, 2008].

Andrew McCormick: "Blinkx Launches Platform to Carry Video Advertising" Internet Citation—BLINKX.COM, [Online] Jul. 26, 2007, XP007906640 Retrieved from the Internet: URL: http://www.blinkx.com/article/blinkx-launches-platform-carry-video-advertising~427> [retrieved on Dec. 15, 2008].

Blinkx: "Blinkx and Utarget Partner to Bring Compelling, Relevant Video Advertising to Online TV" Internet Citation—BLINKX.COM, [Online] Sep. 13, 2007, XP007906636 Retrieved from the Internet: URL: http://www.blinkx.com/article/blinkx-utarget-partner-bring-compelling-relevant-video-advertising~457> [retrieved on Dec. 15, 2008].

Blinkx: "blinkx Technology White Paper" Internet Citation, [Online] XP007906644 Retrieved from the Internet: URL: http://us-store.blinkx.com/images/docs/ws_blinkxTechnologyWhitePaper.pdf> [retrieved on Dec. 15, 2008].

Blinkx: "blinkx SEO White Paper" Internet Citation, [Online] XP007906642 Retrieved from the Internet: URL: http://us-store.blinkx.com/images/docs/ws_blinkxSEOWhitepaper-June2008.p> [retrieved on Dec. 15, 2008].

Blinkx: "Blinkx Technology Under the Hood" Internet Citation—BLINKX.COM, [Online] XP007906646 Retrieved from the Internet: URL: http://us-store.blinkx.com/images/docs/tech.pdf> [retrieved on Dec. 15, 2008].

First Exam Report, European Patent Office, Application No. 07016004.9-1225, mail date Jan. 15, 2009, 1 page.

U.S. Appl. No. 11/594,513, filed Nov. 7, 2006, Chandratillake et al.

Final Office Action for U.S. Appl. No. 11/594,513 mailed Apr. 2, 2010, 18 pages.

Non-Final Office Action for U.S. Appl. No. 11/594,513 mailed Jan. 19, 2011, 16 pages.

Final Office Action for U.S. Appl. No. 11/594,513 mailed Jul. 8, 2011, 8 pages.

*Comark Communications, Inc.* v. *Harris Corp.* 156 F. 3d 1182—Court of Appeals, Federal Circuit, 1998, 8 pages, Federal Reporter third edition.

Silverman, Claim Interpretation Under the Doctrine of Claim Differentiation, published 2001, 3 pages, at www.tms.org/pubs/journals/JOM/matters/matters-0102.html.

Unknown Author, Search pages of the Blinkx.com website, dated Aug. 7, 2006, 2 pages, http://us-search.blinkx.com/tv/search.do?bias=10&filter=true&cg....

Unknown Author, Search pages of the Blinkx.com website, dated Aug. 7, 2006, 1 page, http://www.blinkx.tv/about.php.

Non-Final Office Action for U.S. Appl. No. 11/594,513 mailed Sep. 29, 2009, 17 pages.

* cited by examiner

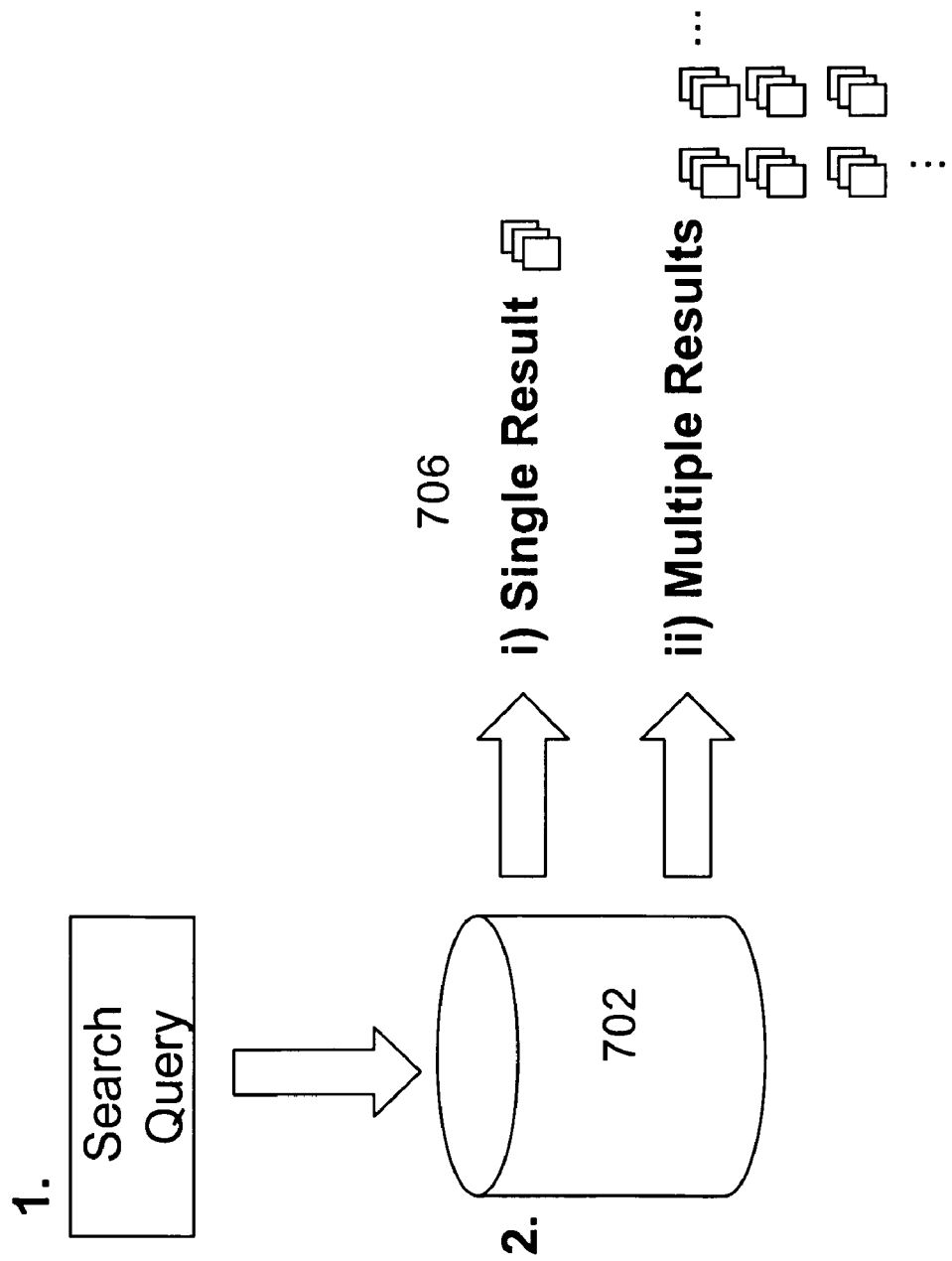

VARIOUS METHODS AND APPARATUS FOR MOVING THUMBNAILS WITH METADATA

RELATED APPLICATIONS

This application claims the benefit of U.S. provisional application No. 60/850,115, filed on Oct. 5, 2006.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Some embodiments of the invention generally relate to a search engine that retrieves moving thumbnails. More particularly, an aspect of an embodiment of the invention relates to video search engines that retrieve moving thumbnails.

BACKGROUND OF THE INVENTION

An explosive volume of video is available within an 'on-demand' context. In an on-demand system, any piece of video can be viewed by any user at any point of time. Unlike a linear or sub-linear system where some centralized scheduling is used and the users are somewhat limited in their viewing choices at a given point in time, an on-demand system makes no guess as to what a given user will want to watch when. A number of challenges exist in facilitating such a system—there is a considerable bandwidth requirement if the system is to be distributed in any way and storage technologies that are able to stream large volumes of data, perhaps in parallel are required, for example. A further challenge that has become apparent only as these systems get larger is that of navigation. Put simply, when the average consumer's video experience was limited to fewer than a hundred explicit linear channels, a simple Programming Guide and channel selector buttons on a remote control may have provided sufficient user interface to the content available. As the corpus of available content gets larger, however, fixed channel and other hierarchical 'choice' systems become increasingly unwieldy to operate and free-form, textual search is used instead.

When free-form search is used over a large corpus, however, it will still often return voluminous amounts of possible search results. A user needs to quickly and efficiently sort through these many options (sometimes numbering in their hundreds) in order to choose a video segment to actually watch. This search problem exists outside the video context and has been solved in various ways—textual search engines (e.g. www.Google.com, www.altavista.com, etc) already make use of so-called 'contextual summarization' that displays a portion of the text of the matching textual document so that a user is able to quickly assess not just that a given document matched their search but also why and how that document matched their search.

SUMMARY OF THE INVENTION

Various methods, apparatuses, and systems are described for a moving thumbnail generator. The moving thumbnail generator generates one or more moving thumbnails that are tagged and time-stamped to arbitrary video trigger events that take place in an associated original video file. Each of the moving thumbnails has two or more moving frames derived from its associated original video file at a portion in the original video file that is tagged and time-stamped to one or more relevant video trigger events in order for the generated moving thumbnail to summarize a visual content of the associated original piece of video file to a user. The tag carries information about content that takes place in the original video file and metadata about that content including a time reference to frames that are contextually relevant to the reason why a viewer of the thumbnail might be interested in viewing that thumbnail. Each moving thumbnail has a relational link back to the original video file associated with the moving thumbnail that can be used to retrieve the original video file.

BRIEF DESCRIPTION OF THE DRAWINGS

The drawings refer to embodiments of the invention in which:

FIGS. 6 and 7 illustrate block diagrams of additional aspects of the moving thumbnail generator and the search engine.

Figure 1:
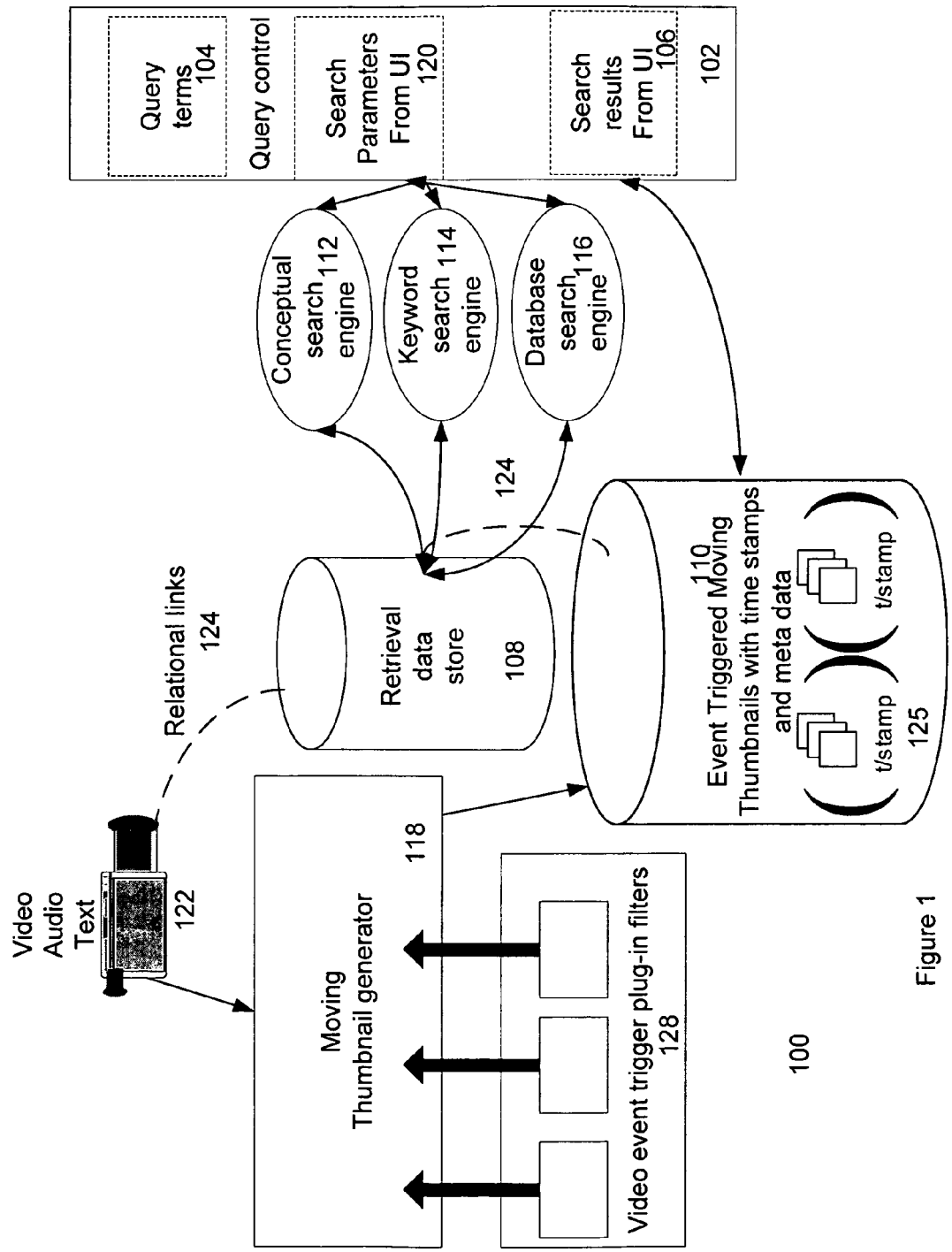
FIG. 1 illustrates a block diagram of an embodiment of a search engine having a moving thumbnail generator.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific signals, named components, types of filters, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. The specific details set forth are merely exemplary. The specific details may be varied from and still be contemplated to be within the spirit and scope of the present invention. The moving thumbnail generator will be discussed in the context of being implemented in an example video search engine and web page, however as will be readily apparent the moving thumbnails may be implemented in other uses.

In general, various methods, apparatuses, and systems are described for a moving thumbnail generator. The moving thumbnail generator generates one or more moving thumbnails that are visually and aurally representative of the content that takes place in an associated original video file. Each moving thumbnail may be tagged and time-stamped to arbitrary video trigger events that take place in an associated original video file. Each of the moving thumbnails has two or more moving frames derived from its associated original video file at a portion in the original video file that is tagged and time-stamped to one or more relevant video trigger events in order for the generated moving thumbnail to summarize a visual content of the associated original piece of video file to a user. The tag carries information about content that takes place in the original video file and metadata about that content including a time reference to frames that are contextually relevant to the reason why a viewer of the thumbnail might be interested in viewing that thumbnail. Each moving thumbnail is stored with a relational link back to the original video file in order so that the moving thumbnail can be used as a linkage back to the original video file by, for example, clicking on the moving thumbnail itself or a link that is displayed near the moving thumbnail.

FIG. 1 illustrates a block diagram of an embodiment of a search engine having a moving thumbnail generator. The search engine 100 may include a query control module 102 that includes a graphic user interface to display to a user a query input box 104, search parameter qualifiers 120, and search results 106 to the query. The search engine 100 also includes a moving thumbnail generator 118, a retrieval data store 108, a moving thumbnail data store 110, one or more attribute filters 128, and may use any combination of several types of search engines such as a conceptual search engine 112, a keyword search engine 114, and/or a database search engine 116. The video search engine 100 is programmed to find one or more video files based on a content of the user's query input supplied to the query input box 104 and search parameter icons 120 selected by the user. The graphic user interface presents the search results 106 of generated moving thumbnails of the one or more video files that summarize the visual content of the original piece of video file to a user. Each of the moving thumbnails includes two or more moving frames derived from the original video file in order to summarize the visual content of that original piece of video to a user. Thus, for each video file returned as a search result, the graphic user interface displays a moving thumbnail corresponding to the original video file as part of the display of the search results 106 to the user. The sequence of the two or more frames quickly and easily summarizes the visual content of that original piece of video file. One or more moving thumbnails may exist for any given video file and, in this case, the moving thumbnail that is closest to the portion of the video that is relevant to the search is returned.

The moving thumbnail generator 118 in connection with the attribute filters 128 analyzes video, audio and textual content from an original video file 122 from a number of sources, such as news broadcast, internet broadcast, etc. The moving thumbnail generator 118 analyzes the content of the video, audio and textual content of the source file 122 to create metadata about the subject matter of the source video file 122. Note, the moving thumbnail generator 118 may also analyze source text files and source audio files as well but the remainder of this description will discuss video files as the source file under analysis. However, the analysis and processing of those purely audio and text source files will be similar.

After analyzing the content in the original video file and the source of the original video file, the moving thumbnail generator 118 generates metadata about key content in the video file such as persons of interest referenced from a list, number of times each person of interest appears in that video file and length of time that person of interest appears in that video file, subject matter that person speaks about in the video file, etc. The tag contains the information including metadata about the events that occur in the original video file in a searchable format.

The moving thumbnail generator 118 module then generates moving thumbnails that are tagged and time-stamped to arbitrary video trigger events that take place in the original source video file 122. The moving thumbnail generator module 118 creates event-driven contextual moving thumbnails 125 from the corpus or incoming stream of these original video files 122. The moving thumbnails 125 are tagged with metadata that captures the video trigger events to which they were originally attached. Each original video file 122 may have one or more animated-video/moving thumbnails 125 associated with that original video file. Each moving thumbnail 125 is tied to a separate video trigger event from that original video file. In an embodiment, multiple moving thumbnails 125 may be associated with each original video file 122.

Each animated video thumbnail 125 may be stored in the thumbnail data store 110 (library/database or other form of storage data structure) to be retrieved by the query control module 102 if relevant to search parameters of the query. These animated/moving thumbnails 125 can also be stored in any standard search index or relational database. The thumbnail data store 110 stores one or more animated/moving thumbnail 125 segments for each video clip, where each animated thumbnail contains content based on different key metadata parameters. As well as the thumbnail itself, the moving thumbnail data store 110 contains data information that ties the thumbnail to the point in time, within the video file, that the two or more frames were extracted from and any relevant metadata from the video file that occurred in or around that moment in time. For example, a particular face may have appeared in the video at that point, or certain words may have been uttered by speakers.

The search engine via the query control module 102 is able to use these time stamp offsets and metadata video triggers to retrieve a moving thumbnail, for every relevant clip, not just a truly visual summary for the clip but also a visual summary that most closes matches the point in time, within the original video file, that is most relevant to the supplied query content. Note, the animated thumbnails 125 are created for an original video file 122 prior to a query being submitted to the search engine 100 by the user. Upon a search, the query control module 102 receives input from one or more of the search retrieval engines 112, 114, 116 on the search results 106 and displays the most relevant of these video trigger events at a portion in a video clip that is tagged and time-stamped to the one or more relevant video trigger events to help the user decide which result is most appropriate for their particular purpose. The query control module 102 selects the appropriate thumbnail associated with the original video file in the moving thumbnail data store 110 to display the most relevant of the video trigger events at a portion in a video clip that is tagged and time-stamped to the one or more relevant video trigger events.

Viewing a moving thumbnail showing frames at the point in time that are most relevant to the supplied query content allows the user to immediately assess, aurally, visually, and potentially textually, not just that the original video file result is relevant but why and how it is. In an embodiment, when the user hovers the cursor over a moving thumbnail, the sounds from the sequence of audio-visual video frames will be piped to the user. In an embodiment, when the moving thumbnail plays on the Direct Play Screen, the sounds from the sequence of audio-visual video frames will be piped to the user.

The search engine 100 contains code scripted to present a moving thumbnail 125 preview of multiple scene sequences of two or more frames of a video clip to a user. The search engine 100 returns a search query of the most relevant video files 106 based on the content supplied to the query input box 104 and search parameter icon 120 qualifiers of the query and presents an animated thumbnail 125 containing a sequence of two or more frames of the relevant sections of the most relevant files based on the query input. Thus, each moving thumbnail 125 presents a sequence of two or more frames of the actual relevant sections of that original video file visually to the user based on the user's query input.

The search engine 100 uses one or more attribute filters 128 to identify various video trigger 'events' relevant to the content in the original video file. The video trigger events in a video may also be manually identified and added to the metadata tag included with each moving thumbnail 125. The attribute filters 128 of the video file being analyzed may include an image analysis tool, a facial image recognition tool, a speech to text converter, a scene change analysis tool, video optical character recognition tool, and other video-audio-or text analysis software that may automatically evaluate content contained in the original video file. The relevant sections are identified by metadata about the content of the original video file such as meta data about particular objects in the video file identified through the image analysis tool and the number of times each identified object appears in that clip, such as facial recognition with a facial image recognition tool, each word spoken via a transcript of the video file identified through the speech to text converter and thus the number of times spoken words of a particular query term or phrase is used that clip as well as indexing particular words to frames of the video file in which they occur, scene change meta data such as length of a particular segment on a specific topic of content identified by a scene change analysis tool, text appearing in a video identified through video optical character recognition tool, and much more metadata items derived from the content of the video file or its source location.

The moving thumbnail generator 118 may generate an index of the relevant metadata. An index of the created thumbnails may be created by the thumbnail store 110. The metadata about each generated moving thumbnail and the weighed essence of the content of the original video file are stored in the thumbnail store 110. The metadata about each generated moving thumbnail may be searched by the one or more search retrieval engines 112, 114, 116.

As discussed, the multiple moving thumbnails for each original video file each contain scenes of multiple frames of the original video file. Each of the scenes is mapped to a time line of defined sub-sections of the original video file that are automatically identified. Each of the scenes has its own set of metadata tied to video triggers occurring in that original video file. The time line may be a frame count, a measurement of time in seconds/microseconds, or some other time indication of a start time and a duration in which the content of the video file was conveyed. Alternatively, each identified attribute of the video file has one or more time codes associated with when that identified attribute occurs in the video file and the time codes are synchronized to the time reference used by the original video file.

Thus, the moving thumbnail generator 118 uses plug-in attribute filters 128 to detect attributes, such aural information, textual information, source information, visual information on things that appear, etc. from a video file under analysis and identify the attributes, an indexer to index the attributes and to assign a time ordered indication with each of the identified attributes, and a tag generator to generates a metadata tag that includes the key identified attributes from this video file and relative weights assigned to each of these identified attributes.

Thus, two or more moving thumbnails 125 may exist for each original video file and the tag associated with each thumbnail carries a timestamp with the metadata to show frames that are contextually relevant to the reason why the viewer of the thumbnail might be interested in viewing that thumbnail. For example, the displayed frames in the thumbnail may be: relevant to search query terms supplied by the viewer; relevant to theme a web page is displaying and the viewer chose to go to that web site, relevant to user's selection for shopping, etc.; relevant to the context that a user history suggests the user would be interested in; etc. The metadata contains the terms to match the relevance to and the timestamps associated to when those relevant trigger events occur in the original video file. Also, each thumbnail 125 has a relational link 128 back to the original video file 122 that can be activated to retrieve the original video file 122. In an embodiment, the relational link in the moving thumbnail retrieves the original video file at the corresponding offset. Thus, the relational link does not just bring back the video source file, but the video source file plays from the point that particular moving thumbnail was taken.

In another embodiment, the moving thumbnails may visually and aurally present representative content that takes place in an associated original video file and not have an associated tag. Either way, the moving thumbnail data store 110 contains the one or more moving thumbnails and the thumbnails are retrievable in response to a query being submitted. The two or more frames for the moving thumbnail can be selected to be between a range of frames, such as two to twenty frames. The sequences of two or more frames of the moving/animated thumbnails are usually 'scenes' within the original video file that are tied to particular points in time in the original video file. In an embodiment, the range of frames is selected from the beginning of the original video clip when the video file starts to display the essence of its video content. The sequences of the two or more frames create a moving thumbnail that conveys visually and aurally, why a particular video scene from the search results 106 may be of interest to the user. One or more relational links 124 exist between a displayed moving thumbnail and its associated original video file. In an embodiment, the relational link 124 may be embedded in the moving thumbnail, associated with a hyperlink displayed near the moving thumbnail such as the title of the original video clip, or associated with the moving thumbnail in a similar manner. The one or more relational links 124 between the displayed moving thumbnail and its associated original video file can be activated to retrieve the original video file by clicking a mouse arrow on the moving thumbnail itself, highlighting the moving thumbnail and depressing an enter key, or clicking a mouse arrow on a link that is displayed near the moving thumbnail. The relational link may bring back the video source file and start playing the video source file from the offset point from the beginning of the video source file that particular moving thumbnail was taken.

The search engine 100 may have two or more types of search retrieval engines to search audio as well as video content files. Seemingly, the search engine 100 has one query input box 104 and some helpful search parameter icons 120 to click on to a user. The user need not conscientiously select a particular type of search engine to perform the search for the user. However, two or more different types of search retrieval engines are employed depending upon the content of the query input supplied by the user and/or the helpful search parameter icons 120 qualifiers attached to content of the query itself by the user. The query control module 102 of the video search engine 100 seamlessly selects from the user's standpoint from the two or more types of search retrieval engines based on the above query content and query qualifier factors attached to the content of the query itself such as 1) the amount and type of query terms supplied by the user to the query input box 104, 2) whether the user has selected various qualifying search parameter icons 120 presented by the graphic user interface to qualify the search parameters, whether the user has historical selection profile, etc. The one or more selectable icons act as qualifiers that can modify search parameters associated with the content of the query supplied by a user. In an embodiment, the query control module 102 of the video search engine 100 selects from the conceptual search retrieval engine 112, the Boolean keyword search retrieval engine 114, and the database search retrieval engine 116, or a similar search retrieval engine.

The conceptual search retrieval engine 112 may process large amounts of structured and unstructured video and audio files. In an embodiment, conceptual search retrieval engine 112 is based on advanced pattern-matching technology that exploits high-performance Bayesian probabilistic techniques. The conceptual search retrieval engine 112 forms a conceptual understanding of text in any format and automates key operations and processing tasks upon it. The conceptual search retrieval engine 112 may form its conceptual understanding of a video file by extracting a set of key terms describing the essence of the video content, and then having a set of mathematical values associated with each term in the set of key terms. The set of key terms are cross referenced to semantically similar terms, and the set of mathematical values associated with each term in an instance of the representation is adjusted based on a historical mathematical value for that term in similar representations. All of the key terms, weights, and links are put into a tag, such as an XML tag, associated with the moving thumbnail. The conceptual search retrieval engine 112 uses information theoretic algorithms and Bayesian algorithms to determine statistics for each attribute extracted from the video content. The set of terms may include single terms, higher order terms, noun phrases, proper names, and other similar types of information as well as relational links and metadata about each term. In an embodiment, for a given key term the engine produces multiple statistics associated with each term. The statistics include position information, those derived from the frequency of occurrence, length of time devoted to a segment on that key term from scene change to scene change, and other statistical information associated with the key terms, at both the individual word used level and sum of the corpus of video level. In an embodiment, key terms may also have their weighted values modified by statistical correlation. The conceptual search retrieval engine 112 implements automated information operations including concept matching, agent creation, agent retraining, agent matching, information categorization, information summarization, and other similar information operations. In an embodiment, the conceptual search retrieval engine 112 is an Autonomy IDOL server available from Autonomy Corporation, Cambridge Business Park, Cowley Rd, Cambridge United Kingdom.

The query control module 102 selects the conceptual search retrieval engine 112 to find search results to the user supplied query by 1) default, 2) if the user has established a search history with the search engine 100, 3) if the user supplies a natural language query of five or more terms, or 4) if the search engine 100 automatically generates a suggested set of returned similar topics the user may want may find of interest based on the content of the supplied query terms to the query box 104 in addition to the search results 106 presented to the user based directly on the supplied query terms. The more query terms and information the user supplies to the conceptual search retrieval engine, the more relevant the returned search results 106 will be to supplied query content. Because the conceptual search retrieval engine 112 cross references semantically similar query terms the user need not worry that supplying additional search terms will exclude relevant videos because that relevant video uses some word different than a supplied query term to convey the desired concept.

The Boolean key word search retrieval engine 114 uses applies Boolean logic operators (searches that use things like 'AND' and 'OR') to the content of the query input to return search result hits for the supplied query terms. Typically, the query control module 102 selects the Boolean key word search retrieval engine 114 for query inputs of four or less query terms to the query input box 104.

The database search retrieval engine 116 uses a database organizational structure to organize the search for selected sources as well as exclude returns from various sources or search for content arranged by date, type, etc.

As will be discussed later in more detail, the query control module 102 has the graphic user interface that presents a user a Date/Relevance Slider icon, a Safe Filter button, one or more content categorizer buttons, a tracking module, and other qualifiers that can be attached to the query content itself by the user. These search parameter icon 120 qualifiers help the database search retrieval engine 116 to exclude types of video and sources of video from the search results 106. These search parameter icon 120 qualifiers also help the query control module 102 to prioritize the display of listed search results 106 as date sensitive or content related search results 106. The search engine 100 lists the search results 106 in order of relevance to the query.

Figure 2:
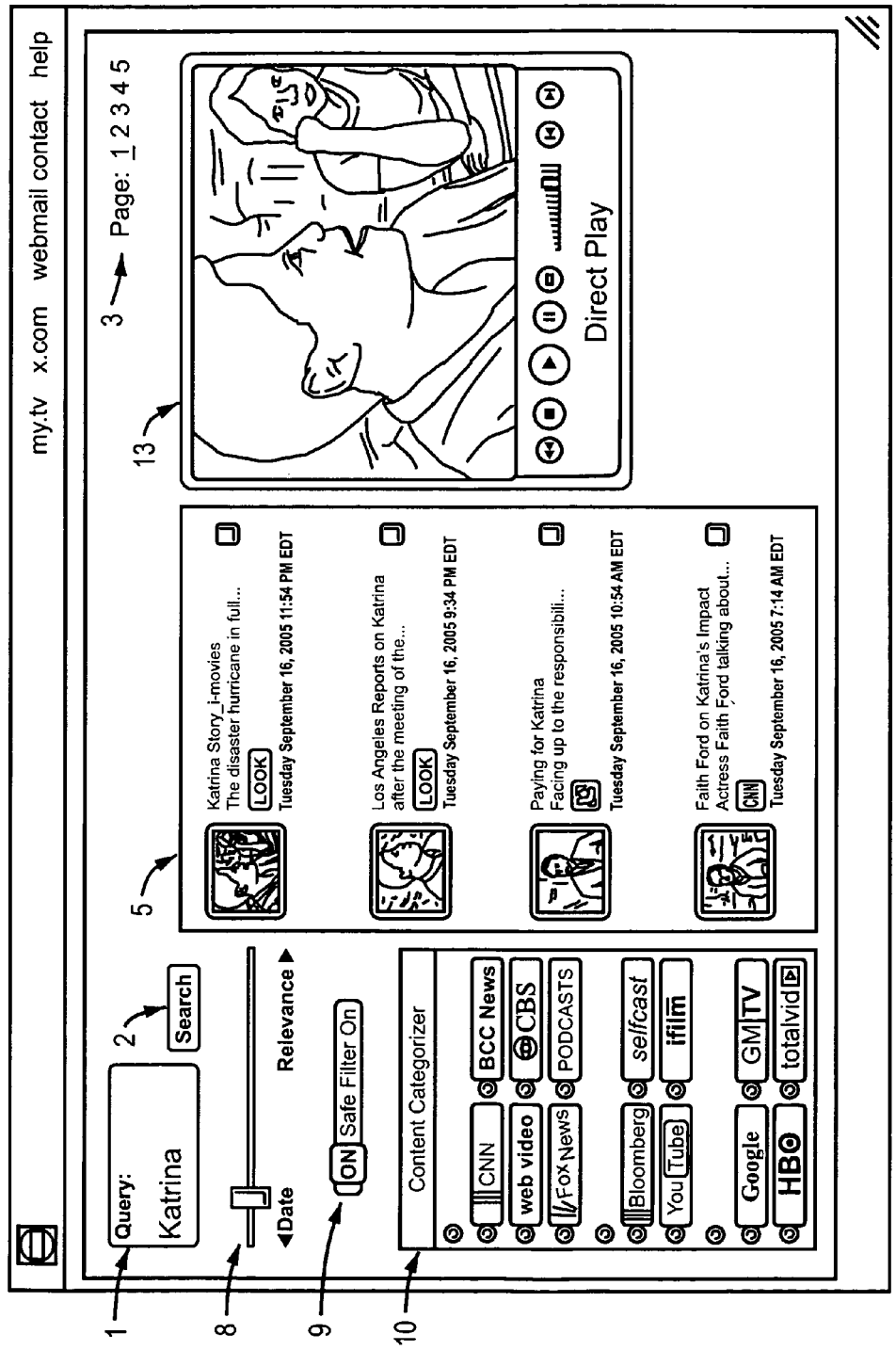
FIG. 2 illustrates an embodiment of a graphic user interface presented by the search engine to a user.

FIG. 2 illustrates an embodiment of a graphic user interface presented by the search engine to a user. The search engine presents a query input for the user to type in query terms and click to cause the search engine to find relevant video files. The user types the terms of the query in the search box (1) and activates, by clicking, the search button (2). Search results (5) of one or more moving thumbnails of the one or more original video files are returned in a list to the right of the box. The user can scroll down the window to view the moving thumbnails results (5). The graphic user interface may shows, for example, ten results per page. To view the next page, the user activates their mouse over the next page number icon located at the top and bottom right hand corners of the screen (3). The search engine contains code scripted to allow a user view a video file associated with the displayed moving thumbnail video clip of a retrieved search result by clicking on the moving thumbnail/moving preview (4) or clicking on the title of the video clip to the right of the moving thumbnail/preview. The search engine also contains code scripted to further present to the user the source of the video clip content, and the date the video clip was created. The icons to the right of the title tell you a little more about the content and a location where an instance of the original video file is stored. The camera icon located at the end of the search result heading indicates that this returned video file is hosted in the retrieval data store and can be viewed on the Direct Play Screen (13) located to the right of the displayed search result (5). The eye and camera icon located at the end of the result heading indicates that this returned video file can be viewed only from the original site. The podcast icon located at the end of the returned video file heading indicates that this returned video file is a podcast.

The query control module allows the user to select several example qualifiers to be attached to the content/search terms of the query itself by the user. The query control module causes the graphic user interface to display a Date/Relevance Slider icon (8), a safe filter button (9), a tracking module (12), and a content categorizer (10) to qualify the parameters surrounding the user supplied query search terms.

The user interface of the search engine allows the user to specify the extent to which date and relevance are of relative importance to that user through some form of biasing mechanism, such as a Date/Relevance Slider (8), or the ability to set a date bias value, and weights the overall results generated by the search engine based on this setting. The query control module may display a Date/Relevance Slider icon. The Date/Relevance Slider icon (8) allows a user to supply input into weighing search results by whether the user is more interested in 1) content that closely matches the search query terms or 2) content that appeared more recently than other content. If the user is looking for news or other breaking information, the query control module allows the user to move the Date/Relevance Slider icon (8) towards date. If user does not care when the video files were created but prefers the best conceptual search results that match the supplied query content, then the user moves the Date/Relevance Slider (8) towards relevance instead.

The query control module displays a safe filter button (9) to ensure that a search engine, such as on TV.blinkx.com™, only returns non-pornographic content. The query control module displays a content categorizer such as TV.blinkx.com Channels™ (10) to allow a user to select exactly which category of content from the search results will come from. Multiple example categories of source files can be included/excluded from the search results, such content source, content theme/topic, as date of content production, popularity of content, the number of times the content has been viewed, whether the content is pay-per-view or free and other similar ways to categorize content, by simply selecting/de-selecting that category as a possible source of video files. The query control module offers all kinds of content from various content sources, ranging in content theme/topic from news to sports and entertainment video, as well as radio, podcast, vlog content. The user can click on the main heading to choose or eliminate all the channels under that category or choose individual channels to be included or excluded from the user's search. For example, the user can deactivate the main icon for all of the news sources or individually deactivate individual new sources such as Euronews.

The search engine has code scripted for Really Simple Syndication (RSS) support so a user can save any search as an RSS feed. The search engine then automatically alerts the user every time relevant content to the user's query criteria appears on the World Wide Web. The search engine also has a tracking module, such as a Smart Folders (12) to allow a user and the search engine to track a user's search over time. The tracking module is bit like RSS except without needing an RSS Reader. In addition, the Smart Folders will automatically download content (if it's hosted in the retrieval data store) to the user's computer so that the user can watch the video file even if the user is not connected to the internet.

The query control module displays a Direct Play Screen. The Direct Play Screen (13) automatically appears if any of the content the user's search returns is hosted in the retrieval data store. If any relevant content is hosted in the retrieval data store, the query control module automatically shows this screen and begins to play back the relevant clips from the moving thumbnails, one after another without the user having to prompt it in any way. The Direct Play Screen (13) also allows the display of the actual video files. The graphic user interface displays user controls such as a Play button, a Pause button, a fast forward button, a rewind button, a Stop button, a Volume control button, and other similar user controls.

Figure 3A:
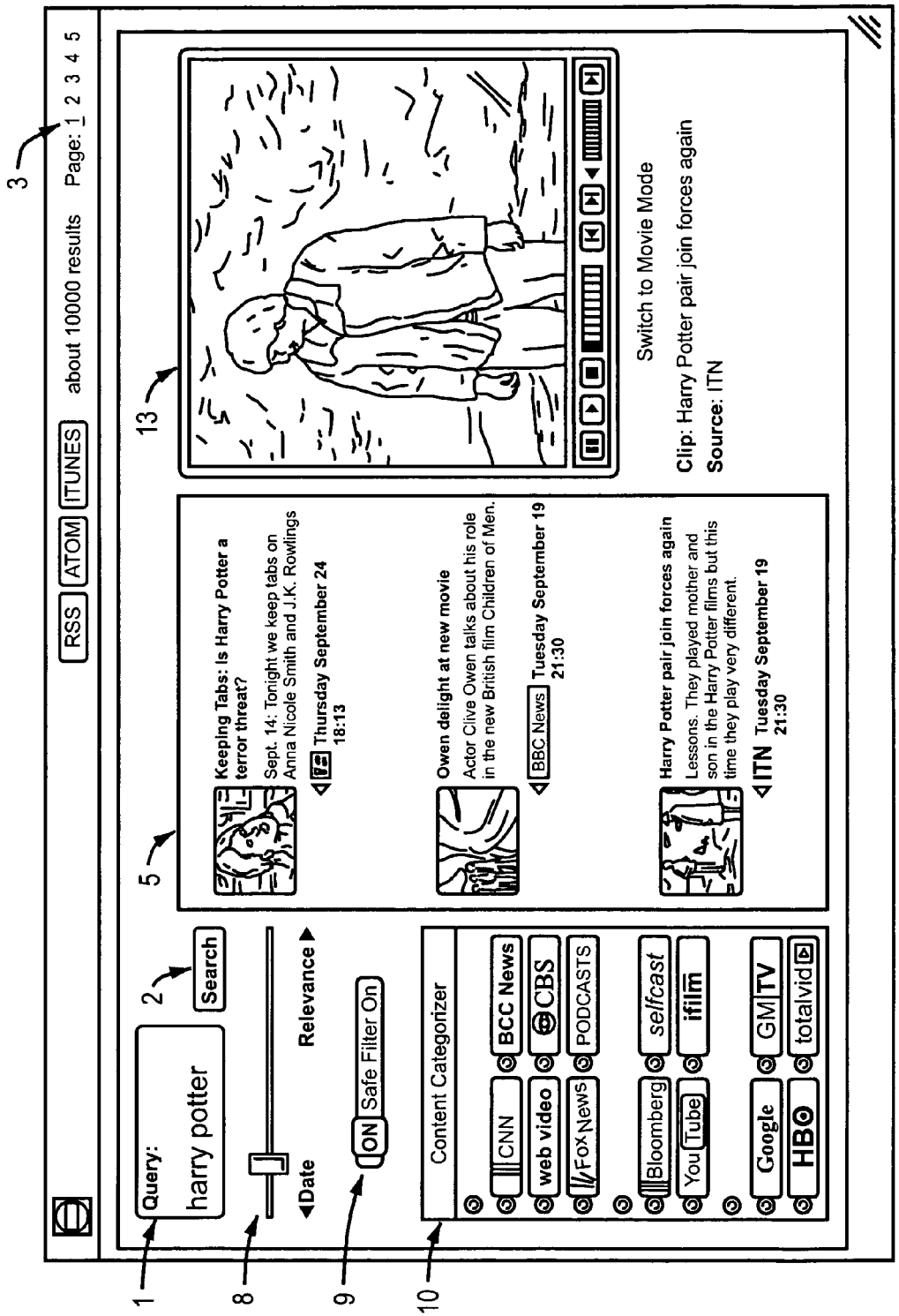
FIGS. 3a and 3b illustrate an embodiment of a graphic user interface presented by the search engine to the user based on certain qualifiers attached to the same supplied query terms.
Figure 3B:
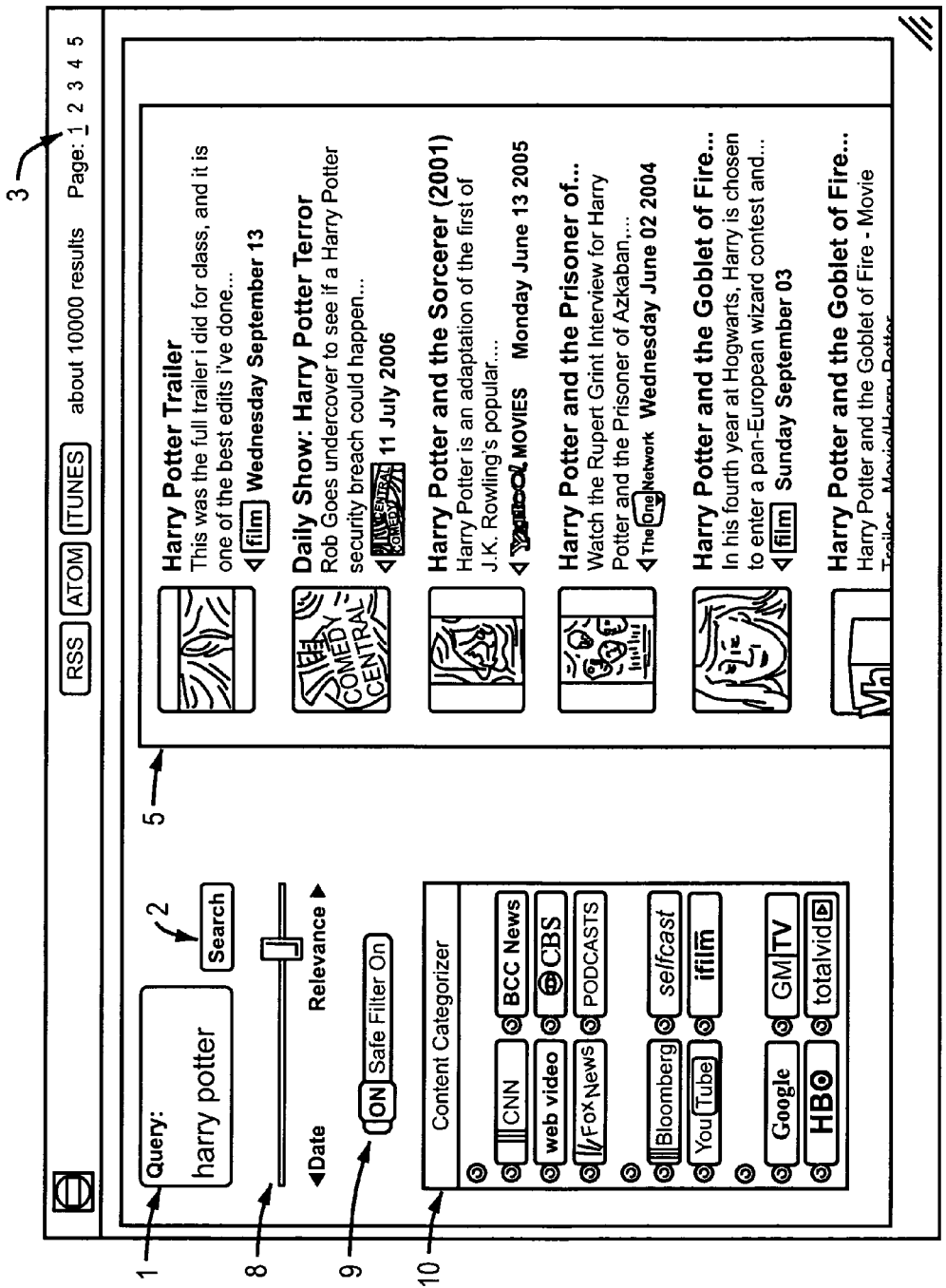

FIGS. 3*a* and 3*b* illustrate an embodiment of a graphic user interface presented by the search engine to the user based on certain qualifiers attached to the same supplied query terms. In FIGS. 3*a* and 3*b*, the query terms in the search box (1) are Harry Potter©. In FIG. 3*a*, the Date/Relevance Slider icon (8) is shifted by the user to towards the date weighting side. Also, all available categories and sources of video files are included in the search parameters because the user has not de-activated any of the category icons in the content categorizer (10). The displayed moving thumbnail search results (5) lists 'Keeping tabs: is Harry Potter a terror threat' as the top video file search result. In FIG. 3*b*, the Date/Relevance Slider icon (8) is shifted by the user to towards the relevance weighting side. Also, the news sources and web pod sources in the content categorizer (10) have been excluded from the search parameters because the user has de-activated both main icons in these categories. The displayed moving thumbnail search results (5) lists a 'Harry Potter trailer' as the top video file search result rather than the 'Keeping tabs: is Harry Potter a terror threat' search result.

Figure 4:
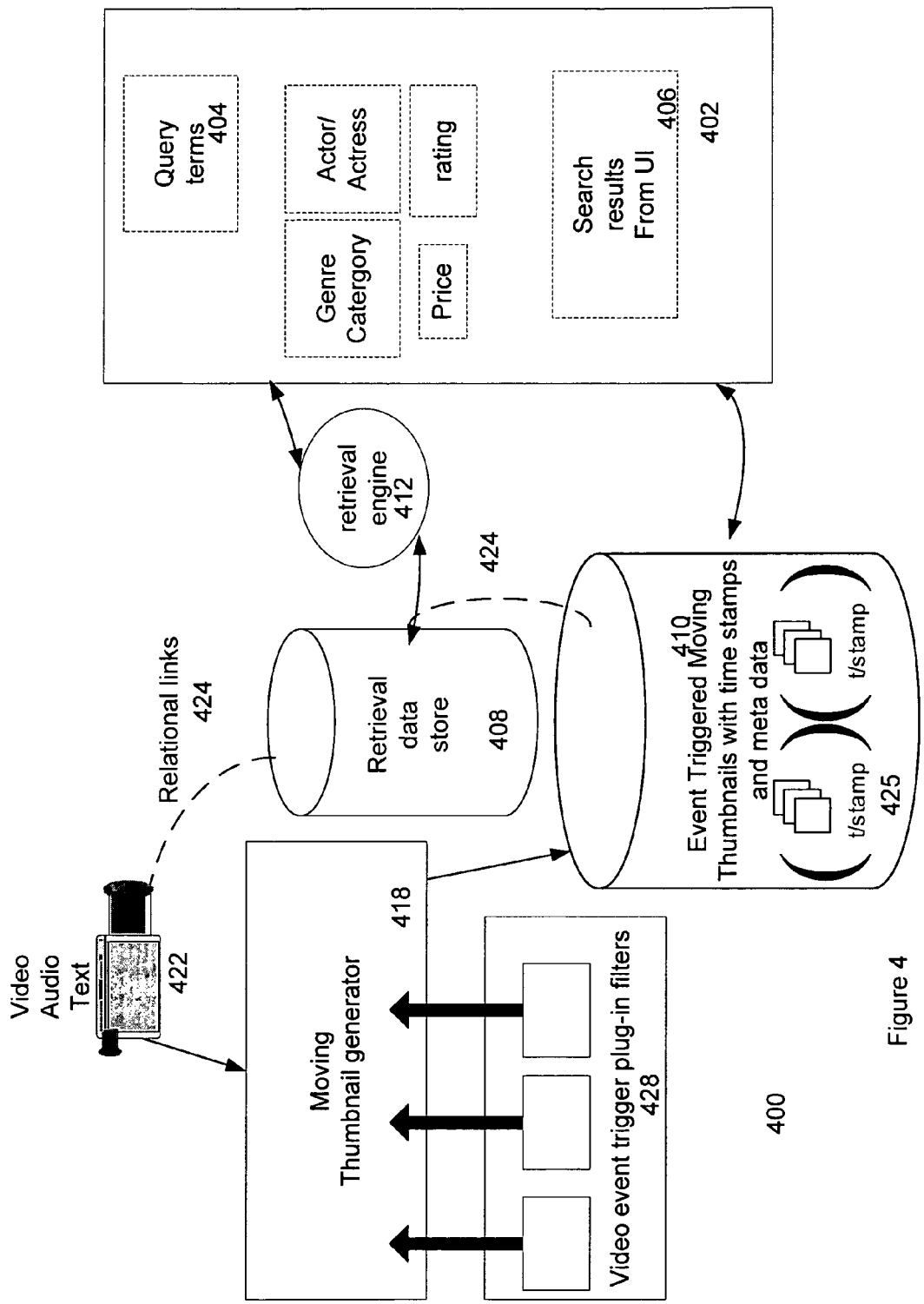
FIG. 4 illustrates a block diagram of another embodiment of an on-demand web page having a moving thumbnail generator.

FIG. 4 illustrates a block diagram of an embodiment of a web page having a moving thumbnail generator. The web page 400 being hosted and maintained on a server may include similar components to FIG. 1. The graphic user interface of the query control module 402 displays the web page. The web page 400 is an example on-demand web page of video files that a user may purchase and first view a moving thumbnail of a video prior to purchasing the video. A user may select different genres of videos, such as Horror, Comedy, etc, to browse. The user may select other qualifiers on retrieving potential videos the user may be interested in, such as actor or actress by name, the price of the video, the movie rating of the video, etc. The user may also add specific query information that does not necessarily fall into a particular category, such as videos on "hurricanes that occur in the Gulf of Mexico between the years 1990 and 2006." in the query terms 404 box. Other viewer's comments and ratings may be part of the metadata stored with the moving thumbnails 425.

The query control module 402 retrieves moving thumbnails 425 that match the user's interest from the thumbnail data store 410. The query control module uses the tag that carries information about the content that takes place in the original video file and ties the moving thumbnail to the point in time, within the original video file, that the two or more frames were extracted from and any relevant metadata from the video file that occurred in or around that moment in time. The more details the user supplies in what the user is interested in viewing to the query control module 402, the more relevant the retrieved moving thumbnails 425 will be because each of the moving thumbnails 425 has two or more moving frames derived from its associated original video file at a portion in the original video file that is tagged and time-stamped to one or more relevant video trigger events and those relevant trigger events match the qualifiers the user wants to see. The moving thumbnail displays these frames from the source video file that are contextually relevant to the reason why the viewer of the moving thumbnail might be interested in viewing that original video file.

Figure 5:
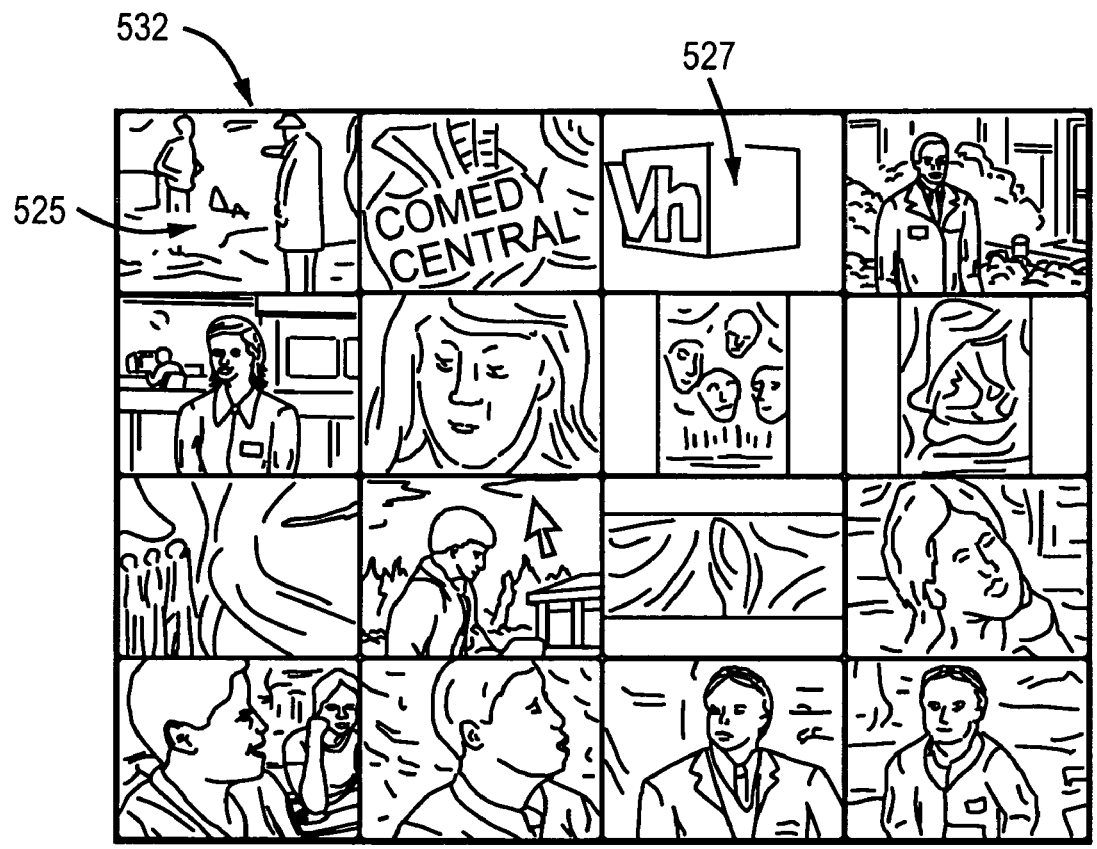
FIG. 5 illustrates a two dimensional diagram of an embodiment of a graphic user interface displaying search results to a user's query as a video wall of multiple moving thumbnails.

FIG. 5 illustrates a two dimensional diagram of an embodiment of a graphic user interface displaying search results to a user's query as a video wall of multiple moving thumbnails. As searches often return multiple results, the search engine also supports a mode for returning more than one relevant moving thumbnail in a grid pattern, known generally as a video wall 532. The moving thumbnails, such as a first moving thumbnail 525, for the one or more original video files are displayed in a piece of long-form video in the grid pattern all at the same time to create the video wall of moving thumbnails 532.

The video wall of two or more animated video thumbnails 532 includes for example twenty-four moving thumbnails including a first moving thumbnail 525 and a second moving thumbnail 527. The video wall of moving thumbnails 532 is capable of showing many search results, allowing a user to view potentially hundreds of potentially relevant moving thumbnail results in the same window space generally taken to represent around ten search results. The video wall 532 is configured to enlarge a thumbnail when a cursor hovers over that thumbnail. The moving thumbnail when enlarged will also aurally project the voices and sounds from the sequence of frames being played for the user. The GUI may also display a textual description of the content of that video thumbnail when a cursor hovers over a moving thumbnail.

Figure 6:
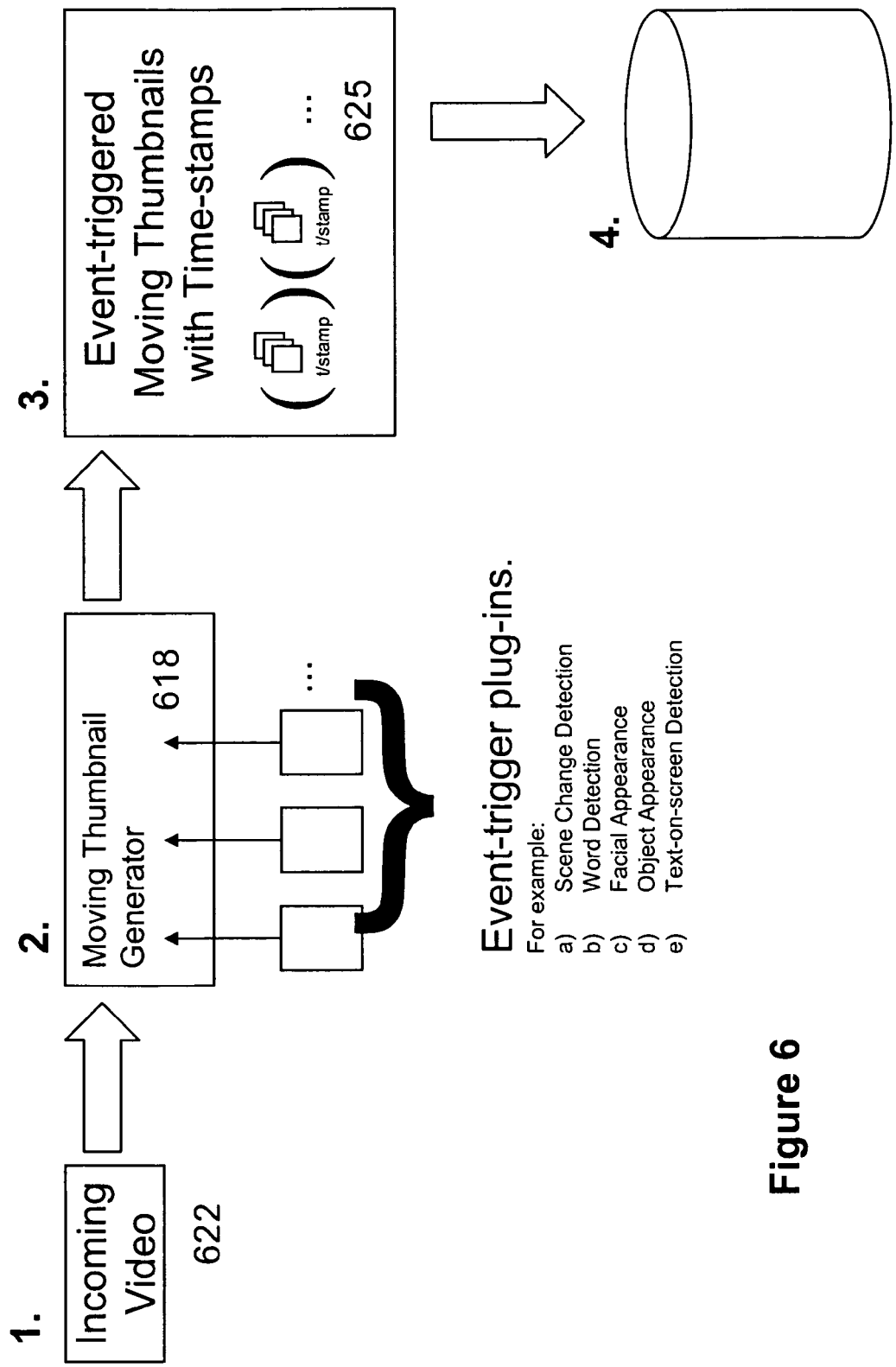

FIGS. 6 and 7 illustrate block diagrams of additional aspects of the search engine. FIG. 6 shows the generation of event-triggered, time-synchronized moving thumbnails 625 by the moving thumbnail generator 618 from an arbitrary original video file 622. In an embodiment, as discussed above, The moving thumbnail generator analyzes content of a video content, an audio content, and a textual content of a source original video file to create the metadata about a subject matter of the source original video file. The one or more moving thumbnails are tagged with information about content that takes place in an associated original video file and metadata about that content including a time reference to frames that are contextually relevant to the reason why a viewer of the thumbnail might be interested in viewing that thumbnail. Further, the moving thumbnail's tag contains the information about content that takes place in an associated original video file in a searchable format. FIG. 7 shows a user's query submitted to the query control module 702 and a displaying of either single or multiple search result retrieval 706 that summarizes the video files relevant to the query using pre-generated, event-triggered moving thumbnails.

The components of the search engine including the moving thumbnail generator may be a combination of hardware logic and/or software. The software portion may be stored on a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices, a hard drive in a server or any other computing device.

The moving thumbnail summarization technique can be used in systems other than a search engine. Whenever a large corpus of video exists and it is necessary to allow a user to rapidly analyze and understand what content is available the moving thumbnails can be used to provide that visual summarization. Example 1: A hierarchical directory system where videos are organized into some form of taxonomy, created either by a central source or body or by users at large. Once a user navigates to a node or end point within this taxonomy, all matching videos can be shown using moving thumbnails that summarize their visual and aural qualities. Example 2: the summarizing of items in a feed. Where an RSS (Really Simple Syndication) or other feed technology is used to syndicate a number of pieces of video content or video files, perhaps over a period of time, the moving thumbnail system can be used to summarize each of those video files. Example 3: in a user generated 'tagsonomy' of content, where content is organized by tags that are applied by users to the content when a user selects a given tag or group of tags, matching video files could be displayed and summarized by their moving thumbnails representations.

While some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The search engine may have a graphical user interface as described above a textual user interface, or an application programming interface. The invention is to be understood as not limited by the specific embodiments described herein, but only by scope of the appended claims.

What is claimed is:

1. An apparatus, comprising:
a moving thumbnail generator hosted on a server to generate one or more moving thumbnails that are tagged and time-stamped to arbitrary video trigger events that take place in an associated original video file, wherein each of the moving thumbnails comprises two or more frames derived from its associated original video file at a portion in the original video file that is tagged and time-stamped to one or more relevant video trigger events in order for the generated moving thumbnail to summarize a visual content of the associated original video file to a viewer on a display screen of a client device and a tag included with the moving thumbnail carries information about content that takes place in the original video file and metadata about that content including a time reference to frames that are contextually relevant to a reason why the viewer of the moving thumbnail might be interested in viewing the original video file, and wherein each moving thumbnail has a relational link back to the original video file associated with the moving thumbnail that can be used to retrieve the original video file, where the moving thumbnails comprising two or more frames derived from its associated original video file are images displayed within the thumbnail's coordinates on the display screen and the images progress through a sequence of images over time within the same coordinates on the display screen, wherein a comparator is used to compare the moving thumbnails with the tagged and time-stamped arbitrary video trigger events that take place in the associated original video file to a reason why the viewer of the moving thumbnail might be interested in viewing the original video file in order to return as a search result the moving thumbnails having frames of content that are contextually relevant to the reason why the viewer of the moving thumbnail might be interested in viewing the original video file, where the moving thumbnail is configured to cooperate with a data store that contains multiple instances of the moving thumbnail for each original video file.

2. The apparatus of claim 1, wherein the moving thumbnail generator has one or more attribute filters to detect attributes from the original video file under analysis and identify the attributes, an indexer to index the attributes and to assign a time ordered indication with each of the identified attributes, and a tag generator to generate the tag carrying metadata that includes key identified attributes from the original video file and relative weights assigned to each of the key identified attributes.

3. The apparatus of claim 1,
wherein the data store is configured to store the moving thumbnails, wherein each original video file has one or more instances of the moving thumbnail associated with that original video file and each of the one or more instances of the moving thumbnail is tied to a separate video trigger event from that original video file, where the tag included with each instance of the moving thumbnail carries the timestamp and the metadata information about the two or more frames to indicate why they are contextually relevant to the reason why the viewer of the thumbnail might be interested in viewing that thumbnail.

4. The apparatus of claim 3, wherein the one or more moving thumbnails for each original video file contain scenes of multiple frames and each of the scenes is mapped to a time line of identified sub-sections of the original video file.

5. The apparatus of claim 3, wherein the tag that carries information about the content that takes place in the original video file further contains data information that ties the moving thumbnail to the point in time, within the original video file, that the two or more frames were extracted from and any relevant metadata from the video file that occurred in or around that moment in time.

6. The apparatus of claim 1, wherein a graphic user interface displays the moving thumbnails in response to at least one of the following: query terms supplied by the user; in response to a theme a web page is displaying; and in response to the user's search history, which suggests that the viewer would be interested in the content of the moving thumbnails.

7. The apparatus of claim 1, wherein the relational link when activated is configured to bring back the original video file and start playing the original video file from a point in the original video file offset from a beginning of the original video file that the moving thumbnail was taken.

8. The apparatus of claim 1, wherein the apparatus is a website hosting a search engine on a computer readable medium that has a user interface, the moving thumbnail generator, and a user's query input, wherein the search engine to find one or more video files based on a content of the user's query input and the user interface to present a search result of generated moving thumbnails of the one or more video files at a portion in the original video file that is tagged and time-stamped to the one or more video trigger events relevant to the content from the user's query input in order for the generated moving thumbnail to summarize a visual content of the original video file to the user, wherein each of the moving thumbnails has an associated tag that contains information about the events that occur in the original video file in a searchable format.

9. The apparatus of claim 8, wherein the user interface presents search results to the content of the user's query input as a video wall of multiple moving thumbnails.

10. The apparatus of claim 8, wherein the user interface presents the one or more moving thumbnails for the one or more original video files as search results to be displayed in a piece of long-form video in a grid pattern all at the same time to create a video wall of moving thumbnails.

11. The apparatus of claim 9, wherein the video wall is configured to enlarge a first moving thumbnail when a cursor hovers over the first moving thumbnail.

12. The apparatus of claim 8, wherein the user interface to present one or more selectable icons to act as qualifiers that can modify search parameters associated with the content of the user's query input.

13. The apparatus of claim 12, wherein the search parameters associated with the content of the user's query are also modified based upon a user's profile.

14. The apparatus of claim 8, wherein the search engine uses one or more attribute filters to identify various video trigger events relevant to the content in the original video file.

15. The apparatus of claim 14, wherein the one or more attribute filters include an image analysis tool, a speech to text converter, a scene change detector, and a video optical character recognition, and the video trigger events of the content of the original video file include objects in the video file identified through the image analysis tool, words spoken in the video file identified through the speech to text converter, scene change information detected by the scene change detector, and text appearing in a video identified through the video optical character recognition.

16. The apparatus of claim 8, wherein the search engine has two or more types of search retrieval engines and a query control module to select which type of search engine to use based on at least in part the user's query input and qualifiers attached to content of the query itself by the user.

17. The apparatus of claim 8, wherein the search engine has a tracking module to allow the search engine to track a user's history of search queries and selected search results over time to automatically modify the search parameters associated with a content of a query supplied to the user's query input.

18. The apparatus of claim 8, further comprising:
a data store to store the moving thumbnails, wherein each original video file has one or more moving thumbnails associated with that original video file and each of the one or more moving thumbnails is tied to a separate video trigger event from that original video file; and
a query control module to select a first moving thumbnail displaying frames from a section within the original video file that is most relevant to the content of the query supplied by the user.

19. The apparatus of claim 8, wherein the search engine has a content categorizer to allow a user to select to include or exclude various categories of content from which the search results may come from.

20. The apparatus of claim 8, wherein the relational link when activated is configured to bring back the original video file and start playing the original video file from a point in the original video file offset from a beginning of the original video file that the moving thumbnail was taken.

21. A method, comprising:
generating one or more moving thumbnails from a server that are tagged and time-stamped to arbitrary video trigger events that take place in an associated original video file, wherein each of the moving thumbnails includes two or more frames derived from its associated original video file at a portion in the original video file that is tagged and time-stamped to one or more relevant video trigger events in order for the generated moving thumbnail to summarize a visual content of the associated original piece of video file to a user in a search results portions of a display screen of a client device, where the moving thumbnail is configured to cooperate with a data store that contains multiple instances of the moving thumbnail for each original video file;
creating and including a tag associated with its moving thumbnail to contain information about content that takes place in the original video file and metadata about that content including a time reference to frames that are contextually relevant to a reason why the viewer of the thumbnail might be interested in viewing that moving thumbnail; and embedding a relational link back to the original video file in or near each moving thumbnail, where the relational link when activated retrieves the original video file, where the moving thumbnails comprising two or more frames derived from its associated original video file are images displayed within the thumbnail's coordinates on the display screen and the images progress through a sequence of images over time within the same coordinates on the display screen, wherein a comparator is used to compare the moving thumbnails with the tagged and time-stamped arbitrary video trigger events that take place in the associated original video file to a reason why the viewer of the moving thumbnail might be interested in viewing the original video file in order to return the moving thumbnails having frames of content that are contextually relevant to the reason why the viewer of the moving thumbnail might be interested in viewing the original video file.

22. The method of claim 21, further comprising:

creating a video wall of two or more moving thumbnails from the moving thumbnails returned as search results, which are displayed in a grid pattern all at the same time.

* * * * *